Feb. 8, 1966    R. T. CORNELIUS    3,233,779
METHOD AND APPARATUS FOR DISPENSING CARBONATED BEVERAGES
Filed March 8, 1962
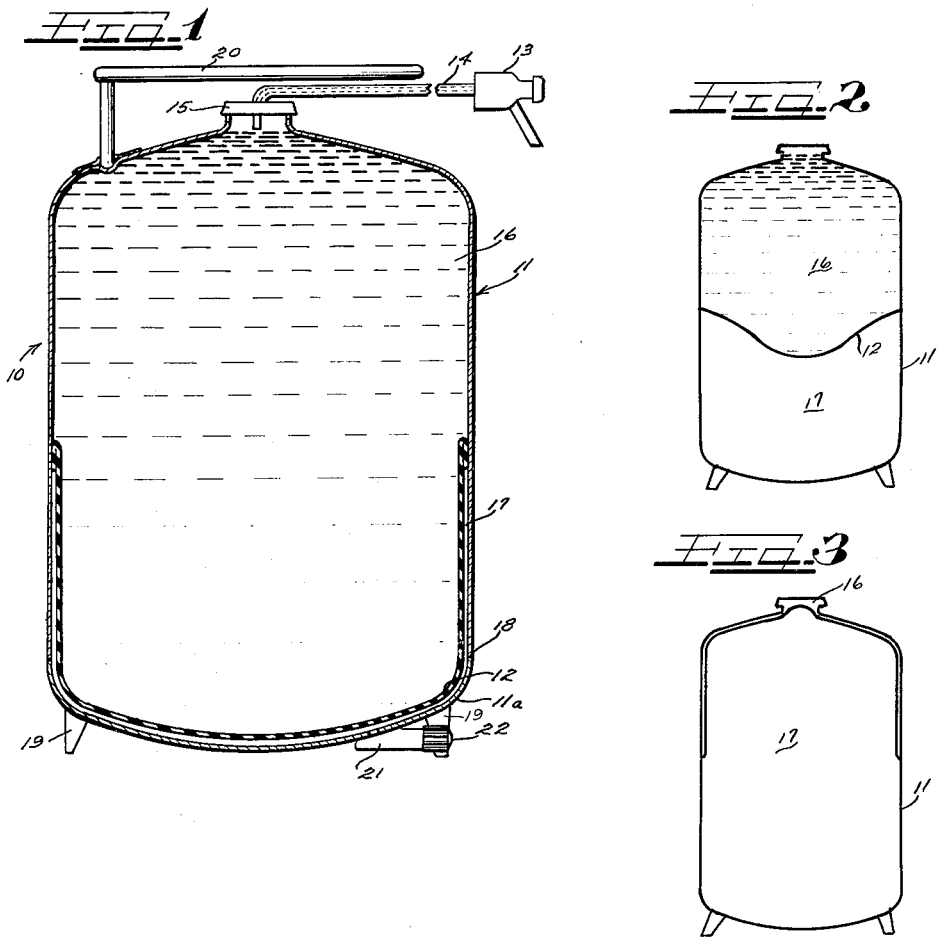
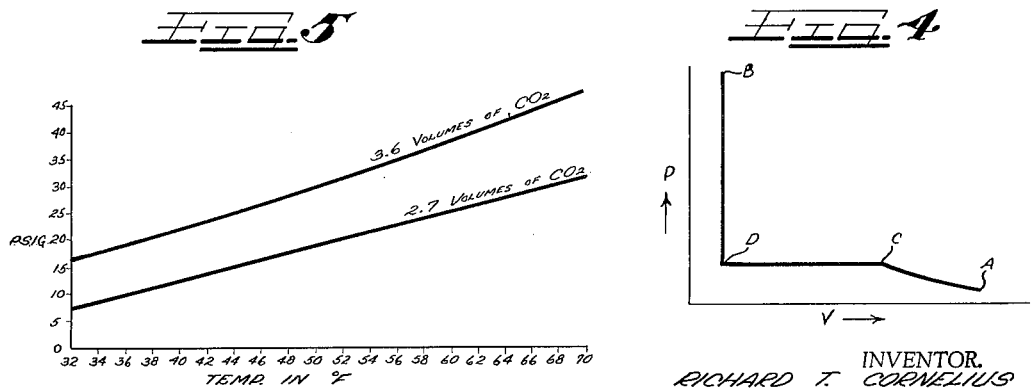
INVENTOR.
RICHARD T. CORNELIUS
BY
Hill, Sherman, Meroni, Gross & Simpson
ATTORNEYS

3,233,779
METHOD AND APPARATUS FOR DISPENSING CARBONATED BEVERAGES

Richard T. Cornelius, Minneapolis, Minn., assignor to The Cornelius Company, Anoka, Minn., a corporation of Minnesota
Filed Mar. 8, 1962, Ser. No. 178,312
4 Claims. (Cl. 222—52)

This invention relates generally to a method and apparatus for dispensing carbonated beverages, and more specifically to the same incorporating use of a condensible gas.

Although the principles of the present invention may be included in various types of dispensing apparatus, a particularly useful application is made in a dispensing apparatus of a size which is adapted to be disposed in a home refrigerator.

Many liquids are used or sold as carbonated liquid solutions, and in particular, as carbonated beverages or "mixes" such as, by way of example, beer, soda pop, root beer, soda water, ginger ale, the "cola" drinks, orangeade, and lemon-lime and other citrus and other fruit base beverages. Such beverages are sold in carbonated form in bottles, cans, and kegs of various sizes and are dispensed therefrom. In that such beverages are carbonated, they have in common the property that each of them comprises an aqueous solution of carbon dioxide ($CO_2$), also known as carbonic acid. The amount of carbonation, or the amount of $CO_2$ gas dissolved in the water in a particular type or brand, is usually controlled closely by the bottler to a predetermined value since the consuming public readily recognizes a deviation, from an amount to which they have become accustomed, as a faulty tasting beverage. The goods will therefore ordinarily leave the bottler's possession with a proper or ideal degree of carbonation.

Thereafter, other factors often adversely affect the amount of carbonation and hence taste, some of which are well known. For instance, a carbonated beverage left in an open container includes carbonic acid which is unstable and soon goes "flat" due to a gradual loss of $CO_2$ to the atmosphere. A carbonated beverage consumed from a glass will have a taste different from that consumed directly from the original container or bottle due to a rapid breakup of carbonic acid and hence a rapid loss of $CO_2$ to the atmosphere during the transfer. A carbonated beverage left in a container from which some of the original quantity of beverage has been withdrawn, the container having been tightly recapped or reclosed, eventually goes nearly flat due to a gradual breakup of carbonic acid and hence loss of $CO_2$ to the air above the remaining beverage. This occurs in the home refrigerator and also in taverns within tapped beer kegs, and is the primary factor that limits the size of containers which are practical for the ordinary home-use market.

Where the container is relatively large, such as a beer barrel, a tap rod coupled with a source of air pressure for the barrel is ordinarily used to effect removal of the beer therefrom for dispensing, but such air pressure in the barrel does not stop the gradual carbonic acid breakup and the ensuing gradual $CO_2$ loss from the beer. Others have pressurized beer barrels with $CO_2$ from a separate source. While such a practice stops the gradual $CO_2$ loss, it causes a gradual $CO_2$ gain, since no carbonic acid in beer is $CO_2$-saturated. Such $CO_2$ gain gradually renders a beer unsalable, if it could be withdrawn, and usually makes a beer so "wild" or unstable that it breaks up into foam upon being drawn into a drinking vessel. $CO_2$-air mixtures have been employed for barrel pressurization, and are an improvement over the use of either $CO_2$ or air alone, but as a practical matter, an ideal mixture is not attained and thus one of the ultimate adverse results discussed will gradually ultimately occur.

The rate of deterioration due to loss of $CO_2$ will be generally proportional to the effective size of the air-space in the container. Thus a closed full container will keep better than a closed nearly empty container. The deterioration rate will also depend upon the surface area of the liquid, and will vary as the liquid level passes through a tapered portion of the container. Barrel pressure, $CO_2$ content of the air in the barrel, the degree of initial carbonation, and the beverage temperature are other critical variables affecting the maintenance of the original preferred carbonation.

This problem has long been recognized in the bottling industry and certain solutions have been attempted which appear to be a betterment, but complexity, cost, inadequate operation, and the like have prevented any method or apparatus from being generally adopted to date. To illustrate, the combined use of a source of $CO_2$ gas with a pressure regulator to supply $CO_2$ to the barrel fails to reach optimum compensation when temperature varies. As temperature goes down, solubility of $CO_2$ in water increases and more gas is absorbed, which ultimately makes the beverage "wild." As temperature goes up, solubility of $CO_2$ in water decreases and $CO_2$ gas is given off and is added to that above the liquid.

A further illustration comprises a temperature compensated $CO_2$ pressure regulator that adds or vents gas, which has been found to date to be more costly to own and operate than the loss it prevents.

Further, the use of bottled compressed nitrogen or air on the barrel has been found to fail since the carbonic acid breaks up and gives off $CO_2$ which gradually dissolves into the air; moreover, as liquid is withdrawn, the barrel pressure decreases.

A partial remedy to the basic problem has been achieved by using a charge of $CO_2$ contained within an imperforate "Mylar" bag deposited right in the beer in the barrel. However, this approach has several disadvantages in that it is difficult to seal the bag to entrap the $CO_2$, it is difficult to obtain complete emptying of the barrel, a rather large barrel is needed to provide space for the original charge of bagged gaseous $CO_2$ at room storage temperatures, and the container needs to withstand an internal pressure range of 15 to 100 p.s.i.g., thereby making it rather heavy. (Even at much higher pressures, $CO_2$ cannot be liquified in such apparatus below its critical temperature of 87.8° F.)

I have found a simple solution to the foregoing problems wherein the carbonated contents of the opened container go neither "wild" nor "flat" over a long period of time, wherein no auxiliary supply of compressed $CO_2$ or air or nitrogen is used, wherein no pressure regulator is employed, wherein the container has almost no interior waste space, wherein container pressures are constant at a relatively low pressure enabling use of thin wall construction, wherein the container cost is competitive with throw away bottles and cans, wherein there is automatic compensation for the temperature of the contents without use of a thermostat, wherein the internal shape of the container and surface area of the contents are no longer a critical variable, and wherein the original degree of carbonation is as stable for a nearly full container as it is for a nearly empty container. Thus, in accordance with the present invention, bulk dispensing methods and apparatus can be, for the first time, effectively and efficiently employed for the home consumption market.

Waste is eliminated and less refrigerator space is consumed. The advantages may also be employed in the tavern field where a high quality carbonated product is to be served.

In order to enable a better understanding of the operation of my invention, certain carbonation principles are summarized here. A carbonated beverage comprises primarily water, and includes flavor-imparting ingredients and also includes $CO_2$ gas in solution in the water, the amount of $CO_2$ being a pertinent taste factor. Such a solution is ordinarily relatively stable, except as to the carbonic acid component and hence as to $CO_2$ content. The total amount of $CO_2$ gas which can be dissolved in the water base of the beverage goes down as temperature goes up, and goes up as pressure goes up. Thus release of pressure by cap removal frequently makes the carbonic acid component of the solution unstable and $CO_2$ gas bubbles form and rise in the solution. A given volume of pure water is capable of dissolving a quantity of $CO_2$ gas which is volumetrically several times greater than the water volume. However, a high degree of carbonation is seldom desired except for soda water.

If a quantity of $CO_2$ gas, or any gas, is released into a room or chamber, the $CO_2$ gas diffuses quite rapidly and thereafter, every sample of air taken from such chamber contains a like percentage of $CO_2$ gas. Such diffusion also occurs from an atmosphere having an above-normal quantity of $CO_2$ to a body of exposed water, but at a slower rate, until the water has dissolved such quantity of $CO_2$ gas as is needed to equal the $CO_2$ concentration in the atmosphere. At room pressure and at a room temperature of 62° F., a quantity of $CO_2$ gas will gradually be absorbed or dissolved which is approximately equal to the volume of water. At higher temperatures, less $CO_2$ gas can be absorbed, and below 62° F., more $CO_2$ gas can be absorbed. If the pressure be increased to ten p.s.i.g., then one volume of $CO_2$ gas can be absorbed at a temperature of 94° F., or 1.65 volumes can be absorbed at 62° F. At 40° F., 2.7 volumes of $CO_2$ gas can be absorbed at 12 p.s.i.g. and 3.6 volumes of $CO_2$ gas can be absorbed at 22 p.s.i.g.

The foregoing examples represent various solution-gas equilibrium conditions, and if the atmosphere above the $CO_2$ solution is richer in $CO_2$ than the solution, a transfer of $CO_2$ gas from the air to the solution will gradually take place until equilibrium is reached. On the other hand, the transfer is reversible in direction. Thus, if the atmosphere above the $CO_2$ solution is leaner in $CO_2$ than the solution, carbonic acid will break up and a transfer of $CO_2$ gas from the solution to the air will gradually take place by diffusion until equilibrium is reached. Therefore, for any particular carbonated solution, there will be a total pressure, which could be applied to a mixed atmosphere above the solution, the atmosphere being partially composed of carbon dioxide gas, which will produce solution-gas equilibrium or no $CO_2$ transfer. Such total equilibrium pressure is a variable dependent upon the temperature of the solution and its degree of carbonation. That part of the total pressure which is derived from $CO_2$ gas and which produces solution-gas equilibrium is known as, and referred to hereafter, as the "partial pressure" of the solution which "partial pressure" becomes the total pressure where the atmosphere is pure $CO_2$ gas. Consider a closed container completely full of a solution carbonated with 2.7 volumes of $CO_2$. Its equilibrium pressure or "partial pressure" is 12 p.s.i.g. of $CO_2$ gas at a temperature of 40° F., 17 p.s.i.g. at 50° F., 24 p.s.i.g. at 60° F., 32 p.s.i.g. at 70° F., 39 p.s.i.g. at 80° F., 47.5 p.s.i.g. at 90° F., etc. A solution having 3.6 volumes of $CO_2$ gas would have a higher partial pressure at each temperature.

In accordance with the principles of this invention, I have provided a simple method and apparatus wherein an equilibrium-type of condition is artificially created by keeping a carbonic acid solution in a non-saturated condition in the absence of additional $CO_2$ gas for it to absorb. The carbonated solution is placed in a closed chamber which is freely variable in size, and a constant total pressure is externally applied to such chamber by a partially condensed condensible gas, which pressure is at all times in excess of the partial pressure of the $CO_2$ gas in the solution. Thus the chamber exerts on the carbonated beverage a pressure greater than that needed to keep the dissolved $CO_2$ gas in solution, and does so while there is no additional undissolved $CO_2$ gas in such chamber, thereby rendering the solution unsaturated but unable to obtain any additional $CO_2$ gas to absorb. Thus the beverage is at all times unable to take on or to give off any $CO_2$ gas. In some instances, the resulting constant pressure may be so high as to cause undue turbulence in the dispensing valve or discharge faucet, thereby producing a "break up" or foaming of the solution being withdrawn. In accordance with a further principle of the present invention, I provide an elongated hose having a somewhat smaller bore size than is conventional connecting the valve to the container, the small hose size being effective due to friction between the hose and the liquid to lower the pressure during the liquid flow gradually along the length of the hose.

Accordingly, it is an object of the present invention to provide an improved method and means for dispensing carbonated beverages.

Another object of the present invention is to provide a method and means for rendering stable the degree of carbonation of a carbonated liquid during storage prior to its being dispensed.

Yet another object of the present invention is to provide simple pressure reducing means for the foregoing apparatus.

A still further object of the present invention is to employ a compressible gas in such a manner that it serves the dual functions of maintaining stability of original carbonation, and providing the expelling force needed to dispense the carbonated solution from the container.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIGURE 1 is a cross-sectional view of an apparatus which may be employed to practice the principles of the present invention, the container being illustrated in a filled and charged condition;

FIGURE 2 is a schematic representation of the container of FIGURE 1 after it has been partially emptied;

FIGURE 3 is similar to FIGURE 2 and illustrates the container in its empty condition;

FIGURE 4 illustrates an isothermal for a typical condensible gas used as a charge; and FIGURE 5 is a graph illustrating the partial pressures for typical carbonated beverages.

As shown on the drawings:

The principles of this invention may be practiced with structural components of varied structural details, of which that shown in FIGURE 1 is representative. FIGURE 1 thus illustrates a representative dispensing system generally indicated by the numeral 10. The system 10 includes a container 11 having a movable wall 12, to which container 11 there is secured a faucet or dispensing valve 13 by means of a hose 14 and coupling assembly 15. The container 11 is divided into a pair of chambers 16, 17 by the movable wall 12 which typically comprises rubber in the shape of a cup peripherally bonded at its mouth to the interior of the container 11 at its axial center as by a heat seal or vulcanizing, whereby the chambers 16 and 17 are sealed from one another. To facilitate such heat seal, the container 11 may include a separate end portion 11a which is secured as by a weld 18 to the remainder of the container 11 after the movable wall 12 has been secured thereto.

The container 11 is provided with a set of feet 19 welded to the end 11a, and on the opposite end, a ring-like structure 20 is secured to the container 11 and serves as a combined handle, guard for the discharge end or coupling 15, and as a structure which nests with the feet 19 of a further container 11 which may rest thereupon in storage.

With the coupling 15 disconnected, a carbonated fluid is inserted or transferred into the chamber 16 to substantially fill the same. Either before, during, or after doing so, the chamber 17 is filled with a charge of condensible gas, whereupon the wall 12 takes the position illustrated in FIGURE 1. The fluid coupling 15 is reassembled to the container 11 as shown, and the apparatus is now ready for service.

Under certain conditions, the dispensing valve 13 would cause the carbonated liquid being discharged to break up as a foam. To avoid this condition, the hose 14 comprises an elongated restriction apparatus or device. The hose has a uniform bore of relatively small diameter, somewhat smaller than would be expected to be used for a dispensing device, and fluid friction between the carbonated liquid and the interior of the hose causes a pressure drop during flow conditions so that the pressure at the dispensing valve 13 is somewhat lower, it having been gradually reduced along the length of the hose 14. A representative size would be a hose having an internal diameter of .100 inch and a length of 18 inches. If the diameter is increased slightly, a longer hose should be provided, namely at least three feet for a bore size of one-eighth inch. These values are intended to be representative to illustrate the principle, and not to be limiting values.

Where the carbonated liquid solution is added to the chamber 16 before the condensible gas is added to the chamber 17, it will be necessary to admit the condensible gas under the influence of a suitable pressurized source. Such admission is made through a port defining means 21 welded to the container end 11a and communicating with the interior thereof. The port defining means 21 is hollow and is provided with an internal structure and valve identical to that used in an automobile tire, and similarly includes a valve cap 22.

In selection of the condensible gas to be employed, there is one relationship which is critical with respect to the carbonated liquid disposed in the chamber 16. The condensible gas, as defined below, must be so chosen that it maintains a pressure in the chamber 17 which is greater than the equilibrium pressure or partial pressure of the gas in solution in the carbonated liquid in the chamber 16, and especially when the liquid in the chamber 16 is at its discharge temperature.

The term "condensible gas" as used herein is any substance whose total volume of liquid (i.e. condensate) and gas may be altered without change in pressure that it exerts when its temperature is kept constant at the discharge temperature of the container 11. To illustrate this property of a condensible gas, reference is made to FIGURE 4 wherein a line or curve is shown which constitutes an isothermal for a typical condensible gas. This isothermal is based upon a gas, the temperature of which is constant. If a gas at an initial temperature has a volume and pressure indicated by the point A, and if the volume is thereafter reduced to that indicated by the point B, the pressure will likewise increase, but not on a straight line. From the point A to a point C, the gas is entirely a vapor; from the point D to the point B the substance is entirely a liquid; however, from the point C to the point D, the volume is decreased during which time the substance is a mixture of gas and liquid, being all gas at the point C and being all liquid at the point D. Thus, between the points C and D the gas is partially condensed and the volume may increase or decrease if temperature is constant without any change in pressure.

Any pressurizing gas used in accordance with the teaching of this invention is such a gas, and the minimum volume of the chamber 17 and the maximum volume of the chamber 17 should fall between the points D and C respectively. The horizontal portion of the isothermal curve defines the condensation pressure of the gas, and it is this pressure which should be greater than the partial pressure of the gas in solution in the carbonated solution, the discharge temperature of the carbonated liquid being the temperature of the isothermal.

If carbon dioxide were to be employed as the condensible gas, and if the discharge temperature were to be 55° F., the condensation pressure would be about 720 p.s.i.g. If discharge temperature were lowered to about 40° F., the condensation pressure would still be approximately 700 pounds. Thus, it is evident that the use of $CO_2$ as the condensible gas would be quite unsatisfactory, since such high pressures would require a somewhat heavier container wall; moreover, such a propelling or expelling force acting on the carbonated beverage would drive it at such a high rate so that it would cause the discharged fluid to break up into foam. However, there are several other gases of the condensible type which can be advantageously used. From this group, which is illustrative and not restrictive, a gas having the appropriate condensation pressure may be selected. Propane gas has a condensation pressure of 109.3 pounds at a temperature of 70° F.; butane gas has a condensation pressure of 16.9 p.s.i. at the same temperature. Blends of these gases have intermediate condensation pressures at this temperature. Where a still lower pressure is desired, dichloromonofluoromethane may be employed which has a condensation pressure of 8.4 p.s.i. at a temperature of 70° F. Other gases having condensation pressures falling within the useful range include Dupont's C-318 and nitrous oxide, blends of which may be employed to obtain intermediate condensation pressures. At lower temperatures, these gases will, as is known, have lower condensation pressures. For example, propane gas has a condensation pressure of 92.4 p.s.i. at a temperature of 60° F.

The less $CO_2$ that is to be maintained in the carbonated liquid, the less the pressure may be in the chamber 17 to maintain the same. However, the pressure in the chamber 17 should be above the partial pressure of the $CO_2$ gas dissolved in the liquid solution in the chamber 16. In FIGURE 5, there is illustrated a pair of curves showing the partial pressures or equilibrium pressure at various temperatures for all carbonated liquid solutions having 2.7 and 3.6 volumes of $CO_2$ gas dissolved therein, respectively. These graphs are presented as being representative, and are not presented by way of limitation. The value of 2.7 volumes of $CO_2$ gas is that which is used by brewers of quality beers. The value of 3.6 volumes of $CO_2$ gas is that used by bottlers of "cola" types of drinks. Bottled soda water usually has higher carbonation, while orangeade usually has lesser carbonation. Thus, various condensible gases may be selected to practice this invention depending upon the substance bottled, or various mixtures of compatible gases may be employed as suggested above. In selecting the gas to be used, the discharge temperature of the carbonated liquid, or the maximum likely discharge temperature is selected, from which by known means the corresponding effective equilibrium pressure of the carbonated liquid is determined. A gas is then selected which at that temperature has a condensation pressure greater than the partial pressure of the $CO_2$ gas dissolved in the carbonated liquid. Assuming that the chamber 16 has a maximum capacity of 144 fluid ounces (which is the same as a case of six-ounce bottles or a twelve-pack of twelve-ounce cans of beer), it will be necessary to inject about two fluid ounces of condensed condensible gas in the chamber 17 to obtain the point corresponding to D in FIGURE 4 which will then produce a pressure lying above the curve of FIGURE 5 for which the gas was selected.

As the temperature of the container and all its contents is lowered, the partial or equilibrium pressure decreases, and so does the condensation pressure, but the condensation pressure retains a value in excess of the partial pressure.

When some of the contents are withdrawn from the chamber 16 by means of the valve 13, the same is effected by the predetermined fixed quantity of condensed condensible gas which expands to a vapor in the chamber 17. Such expansion is accompanied by cooling thereof and the temperature of the gas is quickly restored by heat received through the wall of the container 11 and from the contents in the chamber 16 to thereby restore the original constant pressure in the chamber 17. Ultimately an amount will have been withdrawn through the valve 13 so that the container is partially emptied as shown in FIGURE 2. Still further, the container 11 may be ultimately entirely emptied as shown in FIGURE 3, and for best drainage, inversion thereof is helpful. The condensible gas is not wasted and may be reused upon the next filling of the container 11. Refilling may be by means of a pressurized source of the carbonated liquid and may include a substantial cooling of the condensible gas, or both.

The relationship illustrated in FIGURE 1 from a carbonation retention standpoint is analogous to an originally capped bottle of carbonated beverage. However, the condition illustrated by FIGURE 2 is the one where the instant invention is particularly advantageous. Under this condition, the carbonated liquid cannot go "wild" since there is no place where it can absorb additional $CO_2$. Likewise, it cannot go "flat" since the pressure exerted on the carbonated fluid is greater than the partial pressure of its dissolved gas, or stated otherwise, with this pressure relationship, bubbles of $CO_2$ vapor will not form in the liquid and collect at the coupling since such $CO_2$ vapor bubbles would quickly be absorbed by the unsaturated carbonated liquid which is neither at solution-gas equilibrium nor gas-saturated for that pressure. Moreover, as the temperature of the carbonated liquid goes up, so also does the temperature and condensation pressure of the condensible go so that this relationship is retained for temperature variations of the carbonated liquid.

The instant method and apparatus offers many advantages to the bottler, the retailer, and/or consumer. The container of this system is competitive in cost with a comparable fluid volume of containers which it would replace. The reusable container represents more value to the consumer than a single bottle or can and therefore simplifies deposit problems for the bottler. This system and method enables a reduction in display and storage space for the retailer, and for him eliminates much individual handling of return unsorted bottles. The container 11 of this system can be made somewhat more rugged than present cans or bottles, and therefore can be utilized for a greater number of return trips to the bottling plant. To the user, more beverage may be stored in far less refrigerator space. Not only is it easy for him to use, but he may serve an ounce or two of the product or the entire contents of the container, depending upon his immediate needs. If his needs be small, there will be no significant deterioration with time due to break-up of carbonic acid, even though the contents are partially used. A system incorporating the instant invention is relatively small, is self-pressurizing, and employs little or no added gas per trip through the bottling plant.

The term "absolute" as used herein refers to absolute zero for temperature, and to a perfect vacuum for pressure.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A method for maintaining the carbonation of a stored carbonated beverage comprising:
   (a) disposing the carbonated beverage in a chamber of variable size; and
   (b) continuously applying a force to the outside of the chamber and hence a continuous pressure on the carbonated beverage, which pressure is derived from a quantity of partially condensed condensible gas having a condensation pressure at the temperature of the carbonated beverage which always is in excess of the then-existing partial pressure of the carbon dioxide gas in solution in the carbonated beverage remaining in the chamber, such remaining carbonated beverage comprising at all times an unsaturated carbonic acid.

2. Apparatus for maintaining the carbonation of a stored carbonated beverage comprising:
   (a) a container having a chamber of variable size full of the carbonated beverage; and
   (b) means including a fixed quantity of a partially condensed condensible gas continuously applying a force to the outside of said chamber and hence a continuous pressure on the carbonated beverage, said gas having a condensation pressure at the temperature of the carbonated beverage which always is in excess of the partial pressure of the carbon dioxide gas in solution in the carbonated beverage in the chamber, such carbonated beverage comprising at all times an unsaturated carbonic acid.

3. Apparatus for maintaining the carbonation of a stored carbonated beverage, comprising:
   (a) a rigid storage container having a movable interior wall dividing said container into two variable size chambers;
   (b) a carbonated beverage in one of said chambers; and
   (c) a quantity of partially condensed condensible gas in the other of said chambers, said gas having a condensation pressure at the temperature of the carbonated beverage which is always in excess of the partial pressure of the carbon dioxide in solution in the carbonated beverage in said chamber.

4. A carbonated drink dispenser, comprising in combination:
   (a) a rigid storage container having a movable interior wall dividing said container into two variable size chambers;
   (b) a carbonated beverage in one of said chambers;
   (c) a quantity of partially condensed condensible gas in the other of said chambers, said gas having a condensation pressure at the temperature of the carbonated beverage which is always in excess of the partial pressure of the carbon dioxide in solution in the carbonated beverage in said chamber; and
   (d) a dispensing valve for said beverage communicating through the exterior wall of said one chamber.

References Cited by the Examiner

UNITED STATES PATENTS

| | | | |
|---|---|---|---|
| 103,498 | 5/1870 | Pohlmann | 222—386.5 |
| 1,001,805 | 8/1911 | Bergsvik | 222—386.5 |
| 1,979,605 | 11/1934 | Charmat | 222—386.5 X |
| 2,283,100 | 5/1942 | Shores | 222—386.5 |
| 2,514,773 | 7/1950 | Kromer | 62—166 |
| 2,564,163 | 8/1951 | Le Perre | 222—386.5 X |
| 2,732,105 | 1/1956 | Hillis | 222—386.5 |
| 3,096,000 | 7/1963 | Staley | 222—386.5 X |

LOUIS J. DEMBO, *Primary Examiner.*